United States Patent [19]

Potter et al.

[11] Patent Number: 5,742,784
[45] Date of Patent: Apr. 21, 1998

[54] SYSTEM FOR REORDERING OF INSTRUCTIONS BEFORE PLACEMENT INTO CACHE TO REDUCE DISPATCH LATENCY

[75] Inventors: Terence Matthew Potter; John Stephen Muhich; Christopher Hans Olson; Timothy Alan Elliott, all of Austin, Tex.

[73] Assignee: International Business Machines Corporation, Armonk, N.Y.

[21] Appl. No.: 377,976

[22] Filed: Jan. 25, 1995

[51] Int. Cl.⁶ .................................................. G06F 9/30
[52] U.S. Cl. .................................. 395/389; 395/380
[58] Field of Search .............................. 395/380, 384, 395/383, 389

[56] References Cited

U.S. PATENT DOCUMENTS

| | | | |
|---|---|---|---|
| 4,371,927 | 2/1983 | Wilhite et al. . | |
| 4,437,149 | 3/1984 | Pomerene et al. . | |
| 4,521,850 | 6/1985 | Wilhite et al. . | |
| 4,722,050 | 1/1988 | Lee et al. . | |
| 5,142,634 | 8/1992 | Fite et al. | 395/375 |
| 5,212,794 | 5/1993 | Pettis et al. | 395/700 |
| 5,214,763 | 5/1993 | Blaner et al. | 395/375 |
| 5,442,760 | 8/1995 | Rustad et al. | 395/375 |
| 5,448,746 | 9/1995 | Eickemeyer et al. | 395/375 |
| 5,481,751 | 1/1996 | Alpert et al. | 395/375 |

FOREIGN PATENT DOCUMENTS

0449661  2/1991  European Pat. Off. .

OTHER PUBLICATIONS

Vajapeyam, Sriram, Hsu, Wei–Chung, "Toward Effective Scalqr Hardware for Highly Vectorizable Applications", Journal of Parallel & Distributed Computing, Nov. 1993, vol. 19, No. 3 pp. 147–162.

Vassiliadis Stamatis et al, "In–Cache Pre–Processing and Decode Mechanisms for Fine Grain Parallelism in SCISM", 12th Annual Int'l Phoenix Conference on Computers and Communications, Mar. 23, 1993, pp. 91–97.

IBM Technical Disclosure Bulletin, vol. 32, No. 6A, Nov., 1989 pp. 3–4.

*Primary Examiner*—Richard L. Ellis
*Attorney, Agent, or Firm*—Sawyer & Associates; Mark E. McBurney

[57] ABSTRACT

A method and system for reducing the dispatch latency of instructions of a processor provides for reordering the instructions in a predetermined format before the instructions enter the cache. The method and system also stores information in the cache relating to the reordering of the instructions. The reordered instructions are then provided to the appropriate execution units based upon the predetermined format. With this system, a dispatch buffer is not required when sending the instructions to the cache.

11 Claims, 5 Drawing Sheets

| # | Program Order of the Four Instructions | Cache Line Representation |
|---|---|---|
| 300 | LD1, LD2, FX1, BR1 | BR1, LD2, FX1, LD1 |
| 302 | CMP1, BR1, CMP2, BR2 | BR1, BR2, CMP2, CMP1 |
| 304 | LD1, FL1, ST1, BR1 | BR1, FL1, ST1, LD1 |
| 306 | LD1, LD2, LD3, LD4 | LD4, LD3, LD2, LD1 |

FIGURE 4

SYSTEM FOR REORDERING OF INSTRUCTIONS BEFORE PLACEMENT INTO CACHE TO REDUCE DISPATCH LATENCY

FIELD OF THE INVENTION

The present invention relates to a method and system for improving the performance of a processor and more particularly to a method and system for reducing dispatch latency in such a system.

BACKGROUND OF THE INVENTION

Instruction caching is an important mechanism for high performance, super-scalar processors. This mechanism allows the processor to fetch instructions fast enough to keep up with its execution units even though memory is typically a large number of cycles away. The basic reason for an instruction cache is to reduce the fetch latency. In superscalar processors, another problem leading to dead cycles for execution units associated with the processor is dispatch latency. What is meant by dispatch latency in the context of this application is the amount of time required for an instruction to travel between the cache and the execution unit. Since the dispatcher must decode several instructions and then determine which execution unit instruction is to be delivered, there is some amount of time between the cache and the instructions then entering the execution unit. As dispatchers become more and more complex, the number of execution units increases, and the cycle time decreases, this dispatch latency time becomes more and more significant.

In the past, dispatch latency was reduced by pre-decoding instructions on their way into the cache. Extra bits were required for each instruction to store decode information but when the cache was accessed (cache hit), the dispatcher only needed to look at the decode information to determine where each instruction was going. The cost of this implementation was extra bits for each instruction in the cache (so for the same size cache structure, fewer instructions could be stored), but the benefit was a smaller dispatch latency. Many processors today have a zero cycle dispatch for certain instructions (i.e., branch instructions and the like) as cycles times are reduced there is a greater need for parallel logic to provide this decoding. This parallel adds considerable cost and complexity to the processor.

Accordingly, what is needed is a method and system which will significantly reduce the dispatch latency without the performance penalties of the above-identified conventional scheme. The method and system should be simple to implement and cost-effective. The present invention addresses such a need.

SUMMARY OF THE INVENTION

A method and system in accordance with the present invention provides for reduced dispatch latency in a processor. The method and system comprises reordering the instructions in a predetermined format before the instructions enter the cache, storing information in the cache relating to the reordering of the instructions, and providing the reordered instructions to the appropriate execution units based upon the predetermined format. By predispatching the instructions before they enter the cache, the dispatch latency is significantly decreased and the overall speed of the system is significantly improved.

BRIEF DESCRIPTION OF THE DRAWINGS

FIG. 4 is a table showing the reordering of lines of instruction before dispatch to a cache.

DESCRIPTION OF THE INVENTION

The present invention relates to an improvement in accessing the cache of a computer system. The following description is presented to enable one of ordinary skill in the art to make and use the invention and is provided in the context of a patent application and its requirements. Various modifications to the preferred embodiment will be readily apparent to those skilled in the art and the generic principles herein may be applied to other embodiments. Thus, the present invention is not intended to be limited to the embodiment shown but is to be accorded the widest scope consistent with the principles and features described herein.

Figure 1:
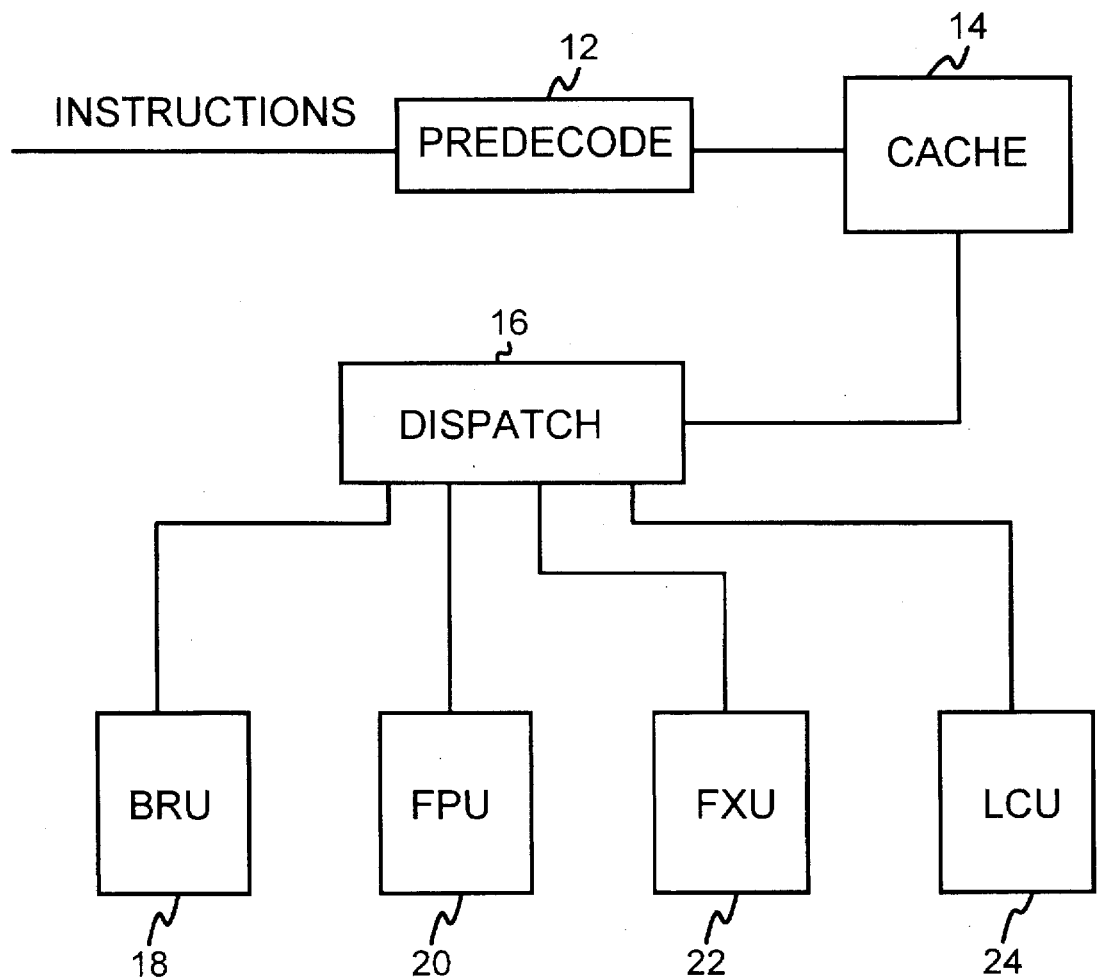
FIG. 1 is a block diagram of a conventional dispatching system utilized in a processor.

FIG. 1 is a block diagram of a conventional dispatching system 10 utilized in a processor. The conventional dispatching system 10 includes a predecode unit 12 which receives instructions and provides those decoded instructions to cache 14. The cache 14 receives the decoded instructions and provides them to dispatch buffer 16. The dispatch buffer 16 then provides the instructions to the appropriate execution unit 18–24.

Instruction caching is an important mechanism for high performance, super-scalar processors. It allows the processor to fetch instructions fast enough to keep up with its execution units even though memory is typically a large number of cycles away. As has been above described, the dispatch latency of the processor becomes more significant, as processors require zero dispatch latency.

Referring back to FIG. 1, the typical way to address the dispatch latency problem is to predecode the instructions before they enter the cache 14. The decode information is then read by the cache 14 and the instruction is sent to the appropriate execution unit 18–24. As has also been beforementioned, the problem with this implementation was that fewer instructions could be stored for the same size cache structure and additional logic was required for providing the decoding.

The present invention provides for a method and system for reducing dispatch latency when a cache is used. The present invention will be described in terms of an instruction-only cache (I-cache). However, one of ordinary skill in the art will readily recognize that this method and system will operate effectively for branch target caches as well as standard instruction caches.

In a method and system in accordance with the present invention, the instructions are stored in the instruction cache(s) in a pre-dispatched format instead of a pre-decoded format. In such a system, one assumption must be made about the processor operation. It is assumed that the number of words received from the cache is constant (i.e., a fixed cache line size).

Figure 2:
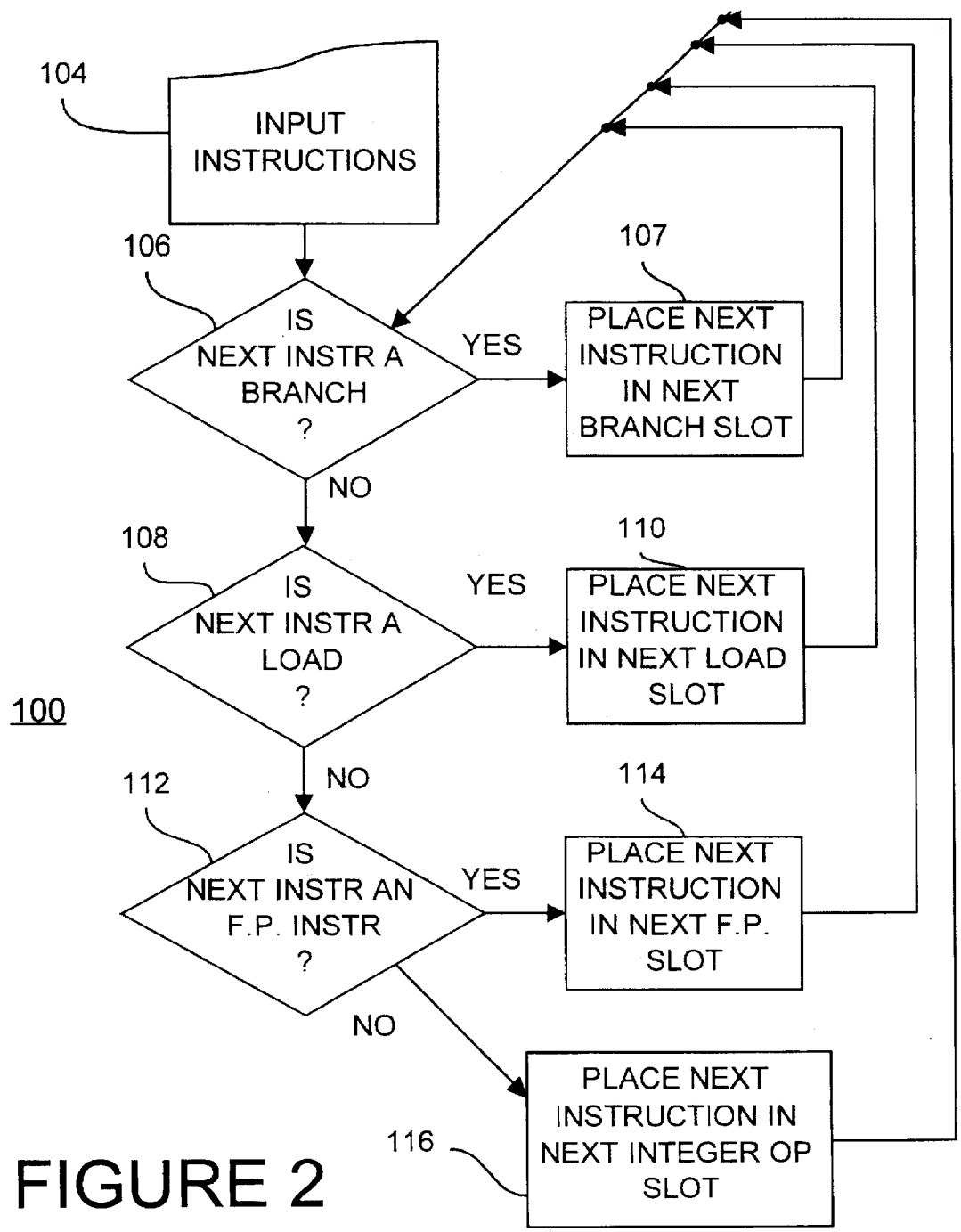
FIG. 2 is a flow chart showing a first embodiment of a system for storing instructions in a predispatched format.

To more particularly illustrate the predispatching system in accordance with the present invention, refer now to FIG. 2 which shows a flow chart 100 of one embodiment of such a system. In this system, the various instructions are input via step 104. Thereafter, in this embodiment, it is determined whether a next instruction is a branch, via step 106. If the next instruction is a branch instruction, then the instruction is placed in a next branch position via step 107. If the instruction is not a branch instruction, then it must be determined if the instruction is a load instruction, via step 108.

If the instruction is a load instruction then the load instruction is placed in a next load instruction position, via step 110. If the instruction is not a load instruction, then, it is determined if the instruction is a floating point instruction, via step 112. If the instruction is a floating point instruction then place instruction in next floating point position, via step 114. If, on the other hand, the instruction is not a floating instruction then the instruction is placed in the next position via step 116. This sequence is repeated until the instructions are loaded in the appropriate manner.

Figure 3:
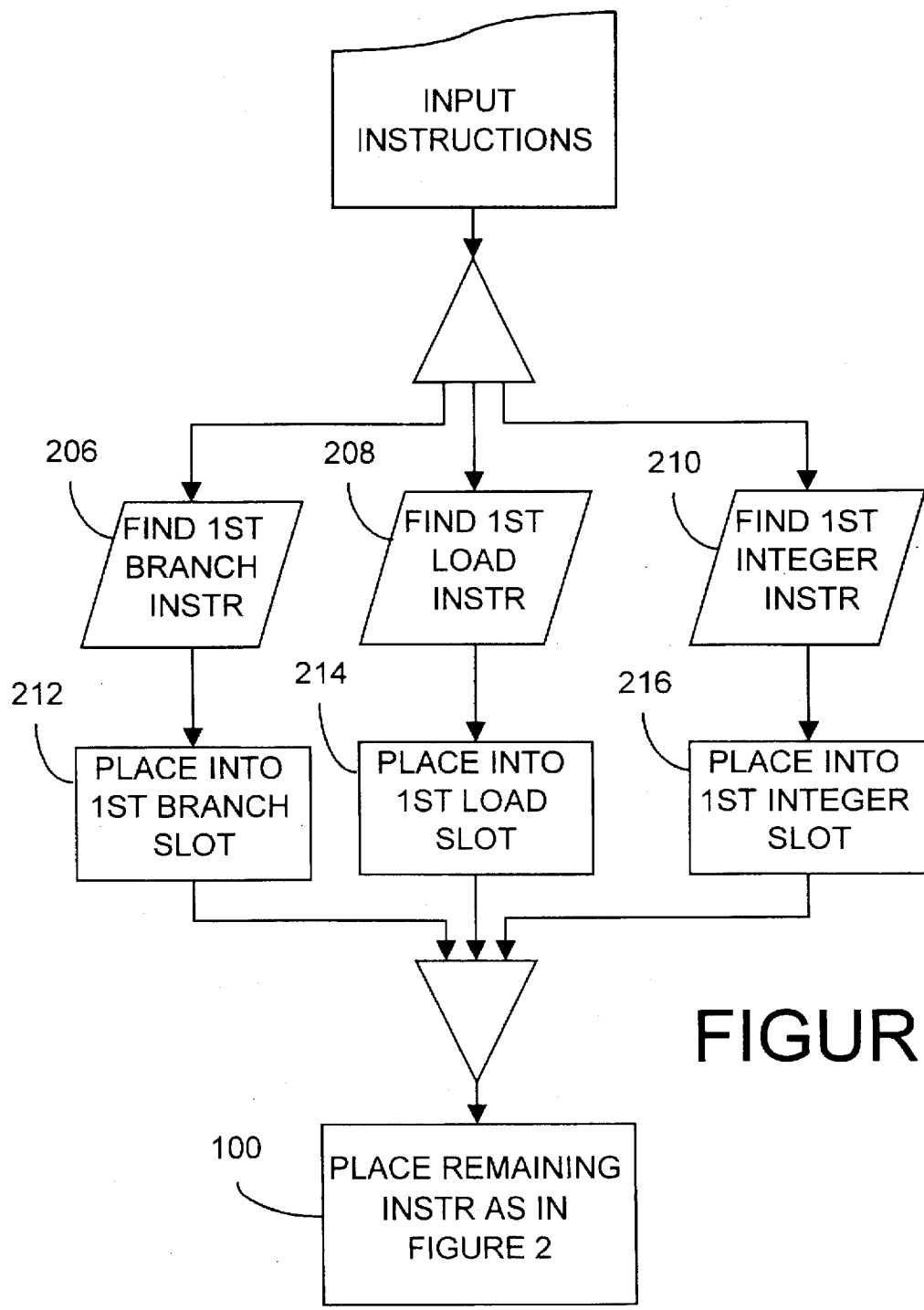
FIG. 3 is a flow chart showing a second embodiment of a system for storing instruction on a cache in a predispatched format.

A more predispatching efficient system is shown in FIG. 3. In this system, the first branch, first load and first floating instructions are located in their respective positions in a simultaneous manner via steps 206, 208 and 210. Thereafter each of these first instructions are placed into their respective positions simultaneously, via steps 212, 214 and 216, respectively. Thereafter, the remaining instructions are placed in the corresponding positions in accordance with the system described in FIG. 2.

Accordingly in a system in accordance with the present invention, instead of storing decode information for each instruction in the cache, the instructions are reordered before they enter the cache. In addition, information relating to the order of instructions for each cache line stored within cache.

In one example, the order that instructions are stored in the cache, could be as follows: the first branch instruction is always the left-most instruction in the cache line, the first load/compare instruction is always the right-most instruction in the cache line. The first floating point instruction is always placed in the position to the left of the first load/compare, and to the right of the first branch instruction.

To more particularly illustrate this example, refer now to FIG. 4, which is a table that shows the ordering of a four word cache line in a predispatched format.

Line 300: In line 300, the branch (BR), fixed point (FX), and first load (LD) must be placed in their appropriate positions, the second LD is then placed in the one remaining position. When the dispatcher unit receives this set of instructions, it must correctly dispatch the second LD to the load/compare unit even though the instruction is in the floating point position, however, it need not dispatch it until the next cycle, because the load/compare unit is already busy with the first LD.

Line 302: In line 302, only the first compare (CMP) and the first BR have their positions set. The second BR is placed in the position next to the first BR and the second CMP is placed in the position closest to the first compare.

Line 304: In line 304, there is one of each type of instruction (LD), so each instruction has a position into which it must be placed.

Line 306: In line 306, only the first LD needs to be placed in a specific location. The rest of the LDs were placed in order (right-to-left) relative to the first LD in anticipation of having to dispatch them in the next cycle.

When instructions are stored in the above format, program order information must also be stored in order for the completion unit/synchronization logic to maintain the appearance of serial completion. This information can take the form of a tag for each instruction which gives the program order position for that instruction. For the four word cache line above, the tag in a preferred embodiment, is a two bit tag per position.

Figure 5:
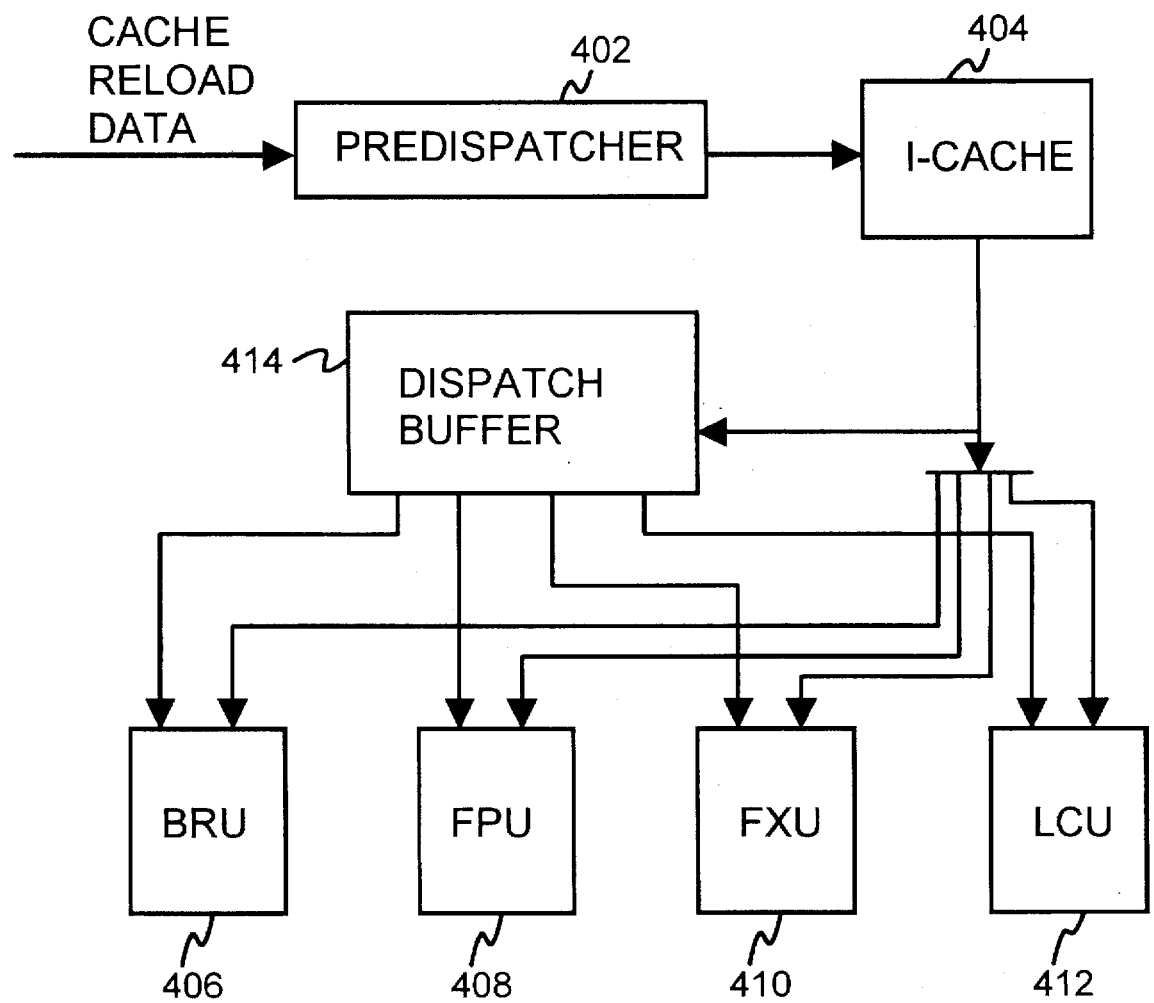
FIG. 5 is a block diagram of a system which utilizes the predispatched systems of FIGS. 3 and 4.

Referring now to FIG. 5 what is shown is a block diagram of a predispatching system 400 for use in a processor in accordance with the present invention. The predispatching system 400 comprises a predispatcher 402 which operates in accordance with the flow charts shown in FIGS. 2 and 3 which provides data to an instruction cache 404 in a particular format. The cache 404 then provides the instructions to the execution units branch unit 406, floating point unit 408, fixed point unit 410 and load control unit 412.

Accordingly, in parallel with dispatching to the execution units 406–412 (based entirely on position—no decoding is done), the entire cache line is placed in a dispatch buffer 414 where the instructions are decoded (in parallel with the first stage of each execution unit). If an instruction is decoded as being in the wrong position (e.g. LD2 in example 300), then it is aborted in the execution unit to which it was originally dispatched (at a minimum, the results are suppressed) and dispatched to the correct execution unit from the dispatch buffer 414.

Note that if an execution unit is busy or the dispatch buffer 414 is dispatching an instruction to that execution unit, the instruction coming from the cache is not dispatched (i.e., the cache instructions are lower priority than the dispatch buffer or execution units' holds).

The predispatching system 400 of FIG. 4 allows for up to four instructions to be dispatched directly from the cache 404 (zero cycle dispatch). Although the present invention has been described utilizing four execution units, one of ordinary skill in the art readily recognizes that any number of execution units could be utilized and their use would be within the spirit and scope of the present invention. The only limitations of the system 400 are that a constant line width is required, and that the line width must be greater than the number of distinct execution units. The execution units 406–412 will also typically have the ability to abort instructions at least one cycle after they are started.

If a one cycle cache is assured, and branch instructions are dispatched, then this system will allow a 0.5 branch-per-cycle throughput (assuming cache hits). With a zero cycle branch target cache, a 1 branch-per-cycle throughput can be maintained (assuming cache hits). Even with applications with very high miss rates (10–15 percent) the number of cycles spent dispatching instructions can be significantly reduced using pre-dispatched caching.

As has been before mentioned, many processors have a zero cycle dispatch for branch instructions. As cycle times are reduced, this will require much more high-speed parallel logic which will take up significant space. Using the pre-dispatched caching system in accordance with the present invention, the logic required to implement the system can be reduced significantly because the first branch in a cache line is always in the same place. Hence, no parallel logic is required for this function. Given space constraints, this system will oftentimes result in faster processor clock rates (dispatch is typically one of the major gating factors for clock speed). Accordingly a system in accordance with the present invention is provided which has significant advantages over the prior art system.

Although the present invention has been described in accordance with the embodiments shown, one of ordinary skill in the art will readily recognize that there could be variations to the embodiments and those variations would be within the spirit and scope of the present invention.

Accordingly, many modifications may be made by one of ordinary skill in the art without departing from the spirit and scope of the appended claims.

What is claimed is:

1. A method for reducing the dispatch latency of instructions of a processor, the processor including a cache receiving the instructions and a plurality of execution units for receiving the instructions from the cache; the method consisting the steps of:

(a) reordering the instructions in a pre-dispatched format before the instructions enter the cache;

(b) storing information in the cache relating to the reordering of the instructions; and (c) providing the reordered instructions to the appropriate execution units based upon the predetermined format.

2. The method of claim 1 in which the instructions comprise branch, load, floating point and fixed point instructions.

3. The method of claim 2 in which the instructions are placed in each line of the cache in a left to right order.

4. The method of claim 2 in which the predispatched format comprises placing a first branch line in a left most position in the cache line, and a first load instruction in a right most position in the cache line.

5. The method of claim 2 in which the reordering step (a) further comprises:

(a1) inputting the instructions;

(a2) determining if a next instruction is a branch instruction;

if the instruction is a branch instruction;

(a3) placing the instruction in the next branch instruction position; then return to step a1;

if the next instruction is not a branch instruction;

(a4) determining if the next instruction is a load instruction;

if the next instruction is a load instruction;

(a5) placing the instruction in the next load instruction position; then return to step (a1)

if the next instruction is not a load instruction;

(a6) determining if the next instruction is a floating point instruction;

if the next instruction is a floating point instruction;

(a7) placing the instruction in the next floating point instruction position;

if the next instruction is not a floating point instruction; and (a8) placing the next instruction in a next available position of the cache line.

6. The method of claim 2 in which the reordering step further comprises:

(a1) finding the first branch instruction and first load instruction and the first instruction;

(a2) placing the first, first branch and first load instructions in the appropriate positions in the cache line.

7. A system for reducing the dispatch latency in a processor consisting:

a predispatch unit for receiving and reordering the instructions in a predispatched format and for providing reordering information;

a cache memory for receiving the reordering information and the reordered instructions from the predispatch unit; and a plurality of execution units for receiving the reordered instructions based upon the pre-dispatched format.

8. The system of claim 7 in which the instructions comprise branch, load, floating point and fixed point instructions.

9. The system of claim 8 in which the instructions are placed in each line of the cache in a left to right order.

10. The system of claim 8 in which the predispatched format comprises placing a first branch line in a left most position in the cache line, and a first load instruction in a right most position in the cache line.

11. A computer readable medium containing program instructions for reducing the dispatch latency of instructions of a processor, the processor including a cache receiving the instructions and a plurality of execution units for receiving the instructions from the cache; the program instructions consisting:

(a) reordering the instructions in a pre-dispatched format before the instructions enter the cache;

(b) storing information in the cache relating to the reordering of the instructions; and (c) providing the reordered instructions to the appropriate execution units based upon the pre-dispatched format.

* * * * *

UNITED STATES PATENT AND TRADEMARK OFFICE
CERTIFICATE OF CORRECTION

PATENT NO. : 5,742,784

DATED : April 21, 1998

INVENTOR(S) : Potter et al.

It is certified that error appears in the above-identified patent and that said Letters Patent is hereby corrected as shown below:

Column 1, Line 41: "cycles" should read 'cycle"

Column 1, Line 43: "parallel" should read "parallel logic"

Column 2, Line 27: "instructions to" should read "instructions to the"

Column 2, Line 29: "to dispatch" should read "to the dispatch"

Signed and Sealed this

Fifteenth Day of June, 1999

Attest:

Q. TODD DICKINSON

Attesting Officer

Acting Commissioner of Patents and Trademarks